United States Patent [19]

Weir et al.

[11] 4,222,999

[45] Sep. 16, 1980

[54] REMOVAL OF SELENIUM FROM SULPHATE SOLUTIONS

[75] Inventors: Donald R. Weir; Eva A. Vosahlo, both of Fort Saskatchewan; Roman M. Genik-Sas-Berezowsky, Edmonton, all of Canada

[73] Assignees: Sherritt Gordon Mines Limited, Fort Saskatchewan; Cominco Ltd., Vancouver, both of Canada

[21] Appl. No.: 933,214

[22] Filed: Aug. 14, 1978

[30] Foreign Application Priority Data

Aug. 19, 1977 [CA] Canada ................................. 285109

[51] Int. Cl.$^2$ ..................... C01G 3/10; C01B 19/00; C25C 1/12
[52] U.S. Cl. .................................... 423/557; 423/42; 423/141; 423/508; 204/DIG. 13
[58] Field of Search ............... 423/508, 509, 510, 557, 423/34, 42, 47, 150, 141; 204/108, DIG. 13

[56] References Cited

U.S. PATENT DOCUMENTS

| | | | |
|---|---|---|---|
| 3,933,635 | 1/1976 | Marchant | 423/510 |
| 3,959,097 | 5/1976 | Queneau et al. | 423/508 |
| 3,964,901 | 6/1976 | Swinkels et al. | 423/508 |
| 4,026,797 | 5/1977 | Nikolic et al. | 423/510 |
| 4,055,630 | 10/1977 | McCoy et al. | 423/508 |

FOREIGN PATENT DOCUMENTS 544611  2/1977  U.S.S.R. ................................. 423/508

*Primary Examiner*—O. R. Vertiz
*Assistant Examiner*—Gary P. Straub
*Attorney, Agent, or Firm*—Arne I. Fors; Robert F. Delbridge

[57] ABSTRACT

A process for purifying copper sulfate solution by converting contained hexavalent selenium to tetravalent selenium which is amenable to removal from solution by heating and maintaining the solution at a temperature in the range of about 135° to 220° C. under a non-oxidizing atmosphere in the presence of bivalent iron. The converted selenium is removed from the solution either by co-precipitation with ferrous iron oxidized and hydrolyzed to ferric oxide at a temperature in the range of 135° to 220° C. and under an oxygen pressure of about 140 to 450 kPa or by cementation with a metal powder at a temperature in the range of about 25° to 85° C. at about ambient pressure under a non-oxidizing atmosphere.

4 Claims, No Drawings

REMOVAL OF SELENIUM FROM SULPHATE SOLUTIONS

This invention relates to solution purification and, more particularly, relates to a process for the purification of copper sulfate solution used in hydrometallurgical processes by the removal of selenium therefrom.

The acid leaching of copper sulfide ores with aqueous sulfuric acid, as described, for example, in Canadian Pat. No. 997,565 issued Sept. 28, 1976, results in the extraction of copper values as cupric ions in solution as a pregnant copper sulfate liquor. Copper values are subsequently recovered as metallic copper by, for example, hydrogen reduction or electrowinning. Iron and selenium values frequently are present in the copper sulfate solution as a result of leaching of copper sulfide ores which generally contain minor amounts of these metals and must be removed from the solution prior to copper recovery to avoid contamination of the copper metal.

U.S. Pat. No. 4,026,797 issued May 31, 1977 discloses a process for removal of selenium from copper electrolytes by (i) the addition of metals such as nickel powder, cobalt powder or iron powder for cementation of copper which sponges selenium at elevated temperature and pressure to reduce the selenium content to levels below 2 mg/l or (ii) the addition of sodium sulfide followed by a subsequent addition of $Fe_2(SO_4)_3$ at elevated temperature and pressure, a two-stage operation, to reduce the selenium content to as low as 1 mg/l or lower.

Removal of iron values to less than 3 g/l and preferably less than 0.5 g/l for copper metal recovery is readily effected by precipitating iron as ferric oxide by oxydrolysis at temperatures below 200° C. Selenium in the tetravalent form is simultaneously removed from the solution by co-precipitation with ferric oxide solids. Any selenium which is in the hexavalent form, however, remains in the solution to contaminate the copper metal product. It is desirable to reduce total selenium to less than 2 mg/l and tetravalent selenium to less than 0.04 mg/l if copper metal recovery is to be effected by electrowinning and to reduce total selenium to less than 0.04 mg/l if copper recovery is to be effected by hydrogen reduction.

We have found that the hexavalent selenium can be reduced in a copper sulfate leach solution to less than 2 mg/l and, if desired, to less than 0.04 mg/l prior to copper recovery by heating the solution to above about 135° C. under non-oxidizing conditions in the presence of soluble bivalent iron, whereby the hexavalent selenium is converted to tetravalent selenium which is amenable to removal from solution. Removal can be accomplished by oxydrolysis of the bivalent iron, i.e. subjecting the heated solution to simultaneous oxidation and hydrolysis of the bivalent iron to ferric oxide whereby the newly formed tetravalent selenium is substantially removed from solution co-precipitated with the ferric oxide, or by cementation of the tetravalent selenium with a metal powder such as copper powder under non-oxidizing conditions at substantially ambient pressure.

More particularly, our invention comprises a process for the purification of copper sulfate solution by converting hexavalent selenium to tetravalent selenium whereby said converted selenium is amenable to removal from solution comprising the steps of heating the solution to a temperature in the range of about 135° C. to 220° C. under a non-oxidizing atmosphere in the presence of bivalent iron and maintaining the solution at said temperature for a time sufficient to achieve the desired degree of conversion. The soluble bivalent iron is present in an amount of at least 0.5 g/l preferably about 3 to 5 g/l for optimum conversion at a temperature in the preferred range of 190° to 215° C. Removal of tetravalent selenium can be accomplished by oxidizing and hydrolyzing the bivalent iron at a temperature in the range of 135° C. to 210° C. under an oxygen pressure of about 140 to 450 kPa whereby the iron precipitates out of solution as ferric oxide and the converted selenium in tetravalent form co-precipitates out of solution with the ferric oxide. Alternatively, removal of said tetravalent selenium can be accomplished by adding a metal powder to the solution maintained under non-oxidizing conditions such as by adding about 2 g/l copper powder to the solution maintained at about 25° to 85° C., preferably about 50° to 80° C., at about ambient pressure.

A typical solution treated according to the process of the invention is a pregnant copper liquor from an acid oxidation leach of a copper sulfide concentrate which contains about 60 to 100 g/l copper, about 5 to 25 g/l sulfuric acid, about 3 to 15 g/l iron, and significant amounts of selenium in the order of up to 6 mg/l.

We have found that heating of the said solution and maintaining the heated solution under a non-oxidizing atmosphere such as provided by purging the conversion reactor with nitrogen or steam for expulsion of oxygen provides satisfactory results. The presence of oxygen has been found to prevent conversion of selenium from its hexavalent form to its tetravalent form and it is therefore important that the non-oxidizing atmosphere be maintained during the heating and conversion of the hexavalent selenium. A reducing atmosphere such as provided by hydrogen is effective but undesirable reduction and precipitation of copper metal can occur if reducing conditions are not carefully controlled.

The heating and maintaining of hexavalent selenium present in a copper sulfate solution under non-oxidizing conditions to a temperature in the range of from about 135° to 220° C., preferably about 190° to 215° C., in the presence of bivalent iron and for a time to permit desired conversion, the time requirement for desired conversion varying inversely with the temperature, has been found critical for conversion of hexavalent selenium to its tetravalent state preparatory to its removal from solution. A temperature as low as about 135° C. with a retention time of 1 to 10 hours may be satisfactory for partial conversion of hexavalent selenium to its tetravalent form for removal of sufficient selenium to reduce total selenium to below 2 mg/l which is satisfactory for an electrowinning operation. A temperature range of 135° to 190° C. with retention time of 1 to 10 hours has been found satisfactory for partial conversion.

Copper recovery by hydrogen reduction on the other hand requires substantially complete removal of total selenium to less than 0.04 mg/l. We have found a temperature range of 190° to 220° C., preferably about 205° C., with retention time as low as 2 minutes, permits almost complete conversion of hexavalent selenium to its tetravalent form.

The quantity of ferrous iron present in solution is important for a rapid rate of conversion. Although soluble bivalent iron as low as 0.5 g/l permits conversion of hexavalent selenium to tetravalent selenium, a range of 3 to 5 g/l is preferred for a short retention time. The retention time will thus be governed by bivalent iron content, temperature, and initial hexavalent selenium content relative to degree of removal desired, a retention time range of 2 to 10 minutes normally being satisfactory for a soluble bivalent iron content of 3 to 5 g/l and a temperature in the range of 190° to 220° C. for a 96% conversion.

Although it is understood that we are not bound by hypothetical considerations, it is believed that the conversion of selenium from the hexavalent to tetravalent state proceeds according to the equation:

$$SeO_4^= + 2Fe^{2+} + 2H^+ \rightarrow SeO_3^= + 2Fe^{3+} + H_2O$$

Tetravalent selenium may be removed from solution co-precipitated with iron by introducing oxygen at an overpressure of from 140 to about 450 kPa to oxidize the remaining bivalent iron to trivalent iron with simultaneous hydrolysis and precipitation from solution. An oxygen overpressure as low as 140 kPa is satisfactory for removing total iron to its preferred target level of less than 0.5 g/l. However, it is believed that higher oxygen overpressures will result in a faster reaction, and hence shorter retention time, and will permit closer control of operating pressures. A retention time of from about 15 to about 25 minutes under oxidizing conditions is adequate for oxidation and hydrolysis of bivalent iron to the iron oxide form.

A bivalent iron content in the range of about 4 to 9 g/l is preferred for removal of tetravalent selenium during the iron oxydrolysis. Removal of tetravalent selenium by co-precipitation with the iron during the oxydrolysis of ferrous iron has been found more effective than scavenging by equivalent amounts of trivalent iron as $Fe_2O_3$ or as $Fe^{3+}$.

Alternatively, the tetravalent selenium once formed can be removed from a copper sulfate solution by cementation with a metal powder selected from the group consisting of metals at and above copper in the electromotive series, excluding alkali metals, such as copper, zinc, iron, nickel, cobalt or aluminum. The metal powder can be added to the copper sulfate solution under a non-oxidizing atmosphere at about ambient pressure and the solution maintained at a temperature in the range of 25° to 85° C. for about 15 minutes to 1 hour for substantial removal from solution with the metal powder. Removal of tetravalent selenium converted from hexavalent selenium under a nitrogen atmosphere down to 0.02 mg/l by the addition of 2 g/l copper powder at 82° C. was effected in 1 hour.

The process of the invention will now be described with reference to the following examples, the first example illustrating difficulty of hexavalent selenium removal.

EXAMPLE 1

The following example confirms the difficulty encountered in removing hexavalent selenium compared to tetravalent selenium at a temperature of 163° C. Synthetic sulfate solutions containing different levels of selenium added as $Na_2SeO_4$ or $H_2SeO_3$ were heated in a 4.5 liter, titanium-lined autoclave equipped with two impellers for thorough agitation of the solutions. The solutions were purged with nitrogen and heated to and maintained at 163° C. under the atmosphere of nitrogen for three minutes and an oxygen overpressure of 450 kPa then applied and maintained to oxidize and hydrolyze the divalent iron to ferric oxide.

The results of the tests are shown in Table 1 below.

Table 1

| Test No. | Selenium Oxidation State | Time at 163° under $O_2$ (min) | Solution Analyses (g/l) | | | | | (mg/l) | % Removal | |
|---|---|---|---|---|---|---|---|---|---|---|
| | | | Cu | Zn | $Fe_T$ | $Fe^{2+}$ | $H_2SO_4$ | $Se_T$ | Fe | Se |
| 1 | $Se^{4+}$ (2 mg/l) | Head | 64.3 | 27.4 | 7.58 | 5.55 | 4.15 | ~2 | | |
| | | 5 | | | 1.63 | 0.14 | 16.1 | 0.04 | 78.5 | 98 |
| | | 60 | | | 0.29 | 0.01 | 19.9 | 0.04 | 96.1 | 98 |
| 2 | $Se^{4+}$ (6 mg/l) | Head | 77.8 | 0 | 6.66 | 5.7 | 4.8 | ~6 | | |
| | | 15 | | | 0.84 | n.a. | 14.8 | 0.12 | 87.0 | 98 |
| | | 60 | | | 0.36 | 0.05 | 16.0 | 0.077 | 94.6 | 99 |
| 3 | $Se^{6+}$ (2 mg/l) | Head | 64.1 | 27.6 | 7.56 | 5.58 | 4.70 | ~2 | | |
| | | 5 | | | 1.97 | 0.68 | 15.4 | 2.0 | 73.9 | 0 |
| | | 60 | | | 0.31 | 0.06 | 19.7 | 1.9 | 95.9 | 0 |

Tests Nos. 1 and 2 were conducted with 2 and 6 mg/l $Se^{4+}$ respectively and Test Nos. 3 was conducted with 2 mg/l $Se^{6+}$. It will be noted that the $Se^{4+}$ was readily removed during the precipitation of iron at 163° C. whereas the $Se^{6+}$ remained in solution at that temperature.

The process of the invention will now be described with reference to the following exemplary tests also carried out in a 4.5 liter, titanium-line autoclave, equipped with two impellers for thorough agitation of the solution.

EXAMPLE 2

A synthetic sulfate solution containing 3 mg/l $Se^{6+}$ added as $Na_2SeO_4$ was heated under an atmosphere of either oxygen or nitrogen to 205° C. to illustrate the effect of atmosphere during heating of the solution for different retention times. At 205° C., 450 kPa oxygen was introduced to the solution purged with and heated up under an atmosphere of nitrogen. Samples were collected from the autoclave at predetermined intervals with the results as indicated by Table 2 below.

Table 2

| Test No. | Atmosphere During Heat-up | Time at 205° under $O_2$ (min) | Solution Analyses (g/l) | | | | | (mg/l) | | % Removal | | % Se Conversion ($Se^{6+} \rightarrow Se^{4+}$) |
|---|---|---|---|---|---|---|---|---|---|---|---|---|
| | | | Cu | Zn | $Fe_T$ | $Fe^{2+}$ | $H_2SO_4$ | $Se_T$ | $Se^{4+}$ | Fe | Se | |
| 1 | Oxygen | Head | 70 | 25 | 7.0 | 5.2 | 6 | 3.0 | 0 | | | |
| | | 5 | | | 0.32 | n.a. | n.a. | 2.8 | ~0.04 | 95.4 | <5 | <5 |
| | | 30 | | | 0.15 | n.a. | 18.1 | 2.7 | n.a. | 97.8 | <5 | <5 |
| | | 30 (FF)* | | | 0.16 | n.a. | 17.9 | 2.8 | ~0.04 | 97.7 | <5 | <5 |

Table 2-continued

| Test No. | Atmosphere During Heat-up | Time at 205° under O₂ (min) | Solution Analyses (g/l) Cu | Zn | Fe$_T$ | Fe$^{2+}$ | H$_2$SO$_4$ | (mg/l) Se$_T$ | Se$^{4+}$ | % Removal Fe | Se | % Se Conversion (Se$^{6+}$→Se$^{4+}$) |
|---|---|---|---|---|---|---|---|---|---|---|---|---|
| 2 | Nitrogen | Head | 70 | 25 | 7.0 | 5.2 | 6 | 3.0 | 0 | | | |
| | | 5 | | | 0.52 | n.a. | 19.6 | 0.2 | ~0.2 | 92.0 | 93.0 | ~98 |
| | | 10 | | | 0.28 | n.a. | 21.3 | 0.06 | n.a. | 96.0 | 98.0 | ~98 |
| | | 30 | | | 0.17 | n.a. | 22.1 | 0.07 | n.a. | 97.2 | 97.7 | ~98 |

*FF - final filtrate - autoclave discharge.

It will be evident from the foregoing Table that a neutral or non-oxidizing atmosphere is necessary during the heating of the hexavalent selenium-containing solution to the desired preferred temperature of 205° C. A conversion of less than 5% of Se$^{6+}$ to Se$^{4+}$ was obtained with an oxygen atmosphere during heating of the solution whereas a conversion of about 98% with 93-98% selenium removal attained by heating the solution under a nitrogen atmosphere.

EXAMPLE 3

This example illustrates the conversion of hexavalent selenium to tetravalent selenium at a preferred temperature of 205° C. under a non-oxidizing atmosphere, specifically a nitrogen atmosphere, with the effect of ferrous iron in solution on the conversion and subsequent oxydrolysis. Sulfate solutions were prepared containing 80 g/l of Cu, 10 g/l Zn, 10 g/l H$_2$SO$_4$, variable g/l Fe$^{2+}$ and 2 or 4 mg/l Se$^{6+}$ added as Na$_2$SeO$_4$ as indicated. Two liter solutions were purged with nitrogen and heated under the nitrogen atmosphere to and maintained at 205° C. with agitation in a titanium autoclave for 5 minutes. An oxygen overpressure of 450 kPa was then applied and the solution sampled at various times indicated.

The results of the tests are shown in Table 3 below.

Table 3

| Initial Se$^{6+}$ (mg/l) | Initial Fe$^{2+}$ (mg/l) | Time (min) | Atmosphere | Filtrate Assays (g/l) Cu | H$_2$SO$_4$ | Fe$_T$ | Fe$^{2+}$ | (mg/l) Se$_T$ | Se$^{4+}$ | Conversion Se$^{6+}$→Se$^{4+}$ (%) | Se Removal (%) |
|---|---|---|---|---|---|---|---|---|---|---|---|
| 2 | 1 | Head | | 77.6 | 9.8 | 1.13 | 0.95 | 2.6 | 0.022 | | |
| | | 0 | nitrogen | 76.4 | 10.8 | 1.10 | 0.82 | 2.6 | 0.60 | 23 | 0 |
| | | 30 | oxygen | 76.6 | 10.4 | 0.80 | 0.03 | 2.4 | 1.38 | 58 | 8 |
| | 2 | Head | | 82.8 | 8.4 | 2.22 | 1.79 | 2.6 | 0.0004 | | |
| | | 0 | nitrogen | 82.8 | 8.6 | 2.20 | 1.45 | 2.6 | 1.83 | 70 | 0 |
| | | 10 | oxygen | 82.8 | 11.9 | | | | | | |
| | | 30 | oxygen | 82.8 | 14.5 | 0.35 | 0.03 | 0.81 | 0.69 | >95 | ~69 |
| | 5 | Head | | 78.0 | 6.4 | 5.14 | 4.92 | 2.2 | 0.04 | | |
| | | 0 | nitrogen | 78.0 | 6.0 | 4.97 | 4.42 | 2.0 | 2.2 | 100 | ~10 |
| | | 10 | oxygen | 78.0 | 13.6 | | | | | | |
| | | 30 | oxygen | 78.0 | 14.1 | 0.17 | 0.03 | <0.1 | — | >95 | >95 |
| 4 | 1 | Head | | 84.0 | 9.5 | 1.13 | 1.04 | 3.79 | 0.06 | | |
| | | 0 | nitrogen | 84.0 | 9.9 | 1.12 | 0.72 | 3.24 | 3.18 | 98 | ~15 |
| | | 10 | oxygen | 84.0 | 10.2 | 1.18 | | 3.8 | | | 0 |
| | | 30 | oxygen | 84.0 | 11.0 | 1.02 | 0.04 | (4.3) | 3.26 | | 0 |
| | 2 | Head | | 85.0 | 8.5 | 2.14 | 2.04 | 4.12 | 0.08 | | |
| | | 0 | nitrogen | 85.0 | 8.3 | 2.13 | 1.74 | 4.73 | 3.62 | 88 | 0 |
| | | 10 | oxygen | 85.0 | 12.9 | | | | | | |
| | | 30 | oxygen | 85.0 | 15.2 | 0.33 | 0.04 | 1.25 | 1.12 | 97 | ~70 |
| | 3 | Head | | 84.2 | 8.1 | 3.14 | 3.04 | 3.68 | 0.01 | | |
| | | 0 | nitrogen | 84.2 | 7.8 | 3.11 | 2.38 | 3.22 | 3.54 | 96 | ~4 |
| | | 10 | oxygen | 84.2 | 13.9 | | | | | | |
| | | 30 | oxygen | 84.2 | 15.6 | 0.25 | 0.03 | 0.63 | 0.52 | 97 | ~83 |
| | 5 | Head | | 84.0 | 8.5 | 5.66 | 5.10 | 4.13 | 0.03 | | |
| | | 0 | nitrogen | 84.0 | 8.4 | 5.52 | 4.12 | 3.8 | 3.62 | 96 | ~8 |
| | | 10 | oxygen | 84.0 | 16.9 | | | | | | |
| | | 30 | oxygen | 84.0 | 17.7 | 0.25 | 0.02 | 0.19 | 0.13 | >98 | ~95 |

EXAMPLE 4

This example illustrates the effect of temperature on conversion of Se$^{6+}$ to Se$^{4+}$ and subsequent removal during iron precipitation. Sulphate solutions containing either about 2 or about 6 mg/l Se$^{6+}$ as Na$_2$SeO$_4$ were heated in a titanium autoclave under agitation in a nitrogen atmosphere and maintained at the indicated temperatures under nitrogen for 3 minutes. Subsequently, a 450 kPa oxygen overpressure was applied and maintained for 60 minutes with samples collected at indicated times to ascertain the extent of iron and selenium.

Table 4

| Test Number | Temp. (°C.) | Time at Temp. Under O₂ (min) | Solution Analyses g/l Cu | Zn | Fe$_T$ | Fe$^{2+}$ | H$_2$SO$_4$ | mg/l Se$_T$ | % Removal Fe | Se |
|---|---|---|---|---|---|---|---|---|---|---|
| 1 | 163 | Head | 79.5 | 1.96 | 6.7 | 5.8 | 5.0 | ~6 | | |
| | | 30 | | | 0.63 | 0.09 | 16.6 | 6.2 | 90.5 | 0 |
| 2 | 177 | Head | 79.5 | 1.96 | 6.7 | 5.8 | 5.0 | ~6 | | |
| | | 30 | | | 0.36 | 0.04 | 18.3 | 5.3 | 94.6 | 12 |
| | | 60 | | | 0.22 | n.a. | 18.9 | 5.2 | 96.7 | 13 |
| 3 | 185 | Head | 80.0 | 25 | 5.0 | 5.0 | 10 | 2.7 | | |

Table 4-continued

| Test Number | Temp. (°C.) | Time at Temp. Under O$_2$ (min) | Cu | Zn | Fe$_T$ | Fe$^{2+}$ | H$_2$SO$_4$ | Se$_T$ mg/l | Fe % Removal | Se % Removal |
|---|---|---|---|---|---|---|---|---|---|---|
|  |  | 5 |  |  | 1.14 |  | 16.4 | 1.4 | 72 | 48 |
|  |  | 30 |  |  | 0.726 |  | 18.0 | 1.4 | 85 | 48 |
| 4 | 195 | Head | 71.6 | 19.5 | 7.40 | 7.40 | 9.52 | 1.2 |  |  |
|  |  | 0 | 68.6 |  | 8.32 |  | 9.34 | 1.2 | — | — |
|  |  | 30 | 67.8 |  | 0.446 |  | 22.2 | 0.4 | 94.6 | 66 |
|  |  | 60 | 69.7 |  | 0.512 |  | 22.3 | 0.4* | 94.0 | 66 |
| 5 | 205 | Head | 64.1 | 27.6 | 7.56 | 5.58 | 4.7 | ~2 |  |  |
|  |  | 5 |  |  | 0.28 |  | 19.5 | 0.04 | 96.3 | 98 |
|  |  | 60 |  |  | 0.12 |  | 23.6 | 0.04 | 98.4 | 98 |

*0.04 mg/l Se$^{4+}$

No selenium was removed at a temperature of 163° C. and 30 minutes retention, 12 and 13% selenium were removed at 177° C. at 30 and 60 minutes retention respectively, 48% selenium was removed at 185° C., 66% selenium was removed at 195° C. at retention times of 30 and 60 minutes respectively, and substantially complete selenium recovery was attained at 205° C. with 98% removal with retention times of as low as 5 minutes.

EXAMPLE 5

The interdependence of temperature and retention time on conversion are further illustrated in this example. Two liter sulfate solutions containing about 80 g/l Cu, 5 g/l Fe$_T$, 10 g/l Zn, 10 g/l H$_2$SO$_4$ and 3.5 mg/l Se$^{6+}$ as Na$_2$SeO$_4$ were heated to and maintained at temperatures of 138, 160 and 182° C. under a nitrogen atmosphere for various retention times. An oxygen overpressure of about 450 kPa was applied for one additional hour.

TABLE 5

| Temp (°C.) | Time (hrs) | Atmosphere | Cu (g/l) | H$_2$SO$_4$ (g/l) | Fe$_T$ (g/l) | Fe$^{2+}$ (g/l) | Se$_T$ (mg/l) | Se$^{4+}$ (mg/l) | Conversion Se$^{6+}$→Se$^{4+}$ (%) | Se Removal (%) |
|---|---|---|---|---|---|---|---|---|---|---|
| 138 | Head |  | 82.2 | 10.1 | 5.14 | 4.90 | 3.30 | <0.02 |  |  |
|  | 3 | nitrogen |  |  |  |  | 3.30 | 0.38 | ~11 |  |
|  | 6 | nitrogen |  |  |  |  | 3.40 | 0.54 | ~16 |  |
|  | 7 | oxygen (1 hr) | 84.4 | 7.42 | 5.18 | 0.04 | 3.20 | N.D. |  | ~3 |
| 160 | Head |  | 81.6 | 9.90 | 5.06 | 4.64 | 3.10 | 0.02 |  |  |
|  | 1 | nitrogen |  | 7.14 |  | 4.28 | 3.86 | 1.08 | ~28 |  |
|  | 2 | nitrogen |  | 8.0 |  | 4.28 | 3.46 | 1.48 | ~43 |  |
|  | 3 | nitrogen |  |  |  |  | 3.40 | 2.00 | ~59 |  |
|  | 4 | nitrogen |  | 8.2 |  | 4.28 | 3.48 | 2.20 | ~63 |  |
|  | 5 | oxygen (1 hr) | 83.6 | 16.9 | 0.90 | 0.03 | 1.0 | N.D. | (~68) | ~68 |
| 182 | Head |  | 82.2 | 10.1 | 5.14 | 4.90 | 3.30 | <0.02 |  |  |
|  | 0 | nitrogen |  | 7.5 |  | 3.93 | 3.74 | 0.68 | ~18 |  |
|  | 1 | nitrogen |  | 7.4 |  | 3.91 | 3.04 | 2.80 | ~92 |  |
|  | 2 | nitrogen |  | 7.9 |  | 3.93 | 3.66 | 2.80 | ~77 |  |
|  | 3 | nitrogen |  |  |  |  | 2.80 | 2.40 | ~86 |  |
|  | 4 | nitrogen |  | 8.9 |  | 3.93 | 3.22 | 2.40 | ~75 |  |
|  | 5 | nitrogen |  | 9.1 |  | 3.73 | 2.94 | 2.40 | ~82 |  |
|  | 6 | oxygen (1 hr) | 82.0 | 19.1 | 0.31 | 0.02 | 0.02 | N.D. | (~94) | ~94 |

Table 6

| Test No. | Time (min) | Atmosphere (kPa) | Fe$_T$ g/l | H$_2$SO$_4$ g/l | Se$_T$ mg/l | Fe % Removal | Se % Removal |
|---|---|---|---|---|---|---|---|
| O$_2$ overpressure 140–175 |
| 1 | 0 | N$_2$ | 5.03 | 11.5 | — | — | — |
| 2 | 5 | O$_2$ | 0.276 | 19.5 | 0.04 | 94.5 | 98 |
| 3 | 15 | O$_2$ | 0.202 | 21.3 | — | 96 | — |
| 4 | 30 | O$_2$ | 0.193 | 22.0 | — | — | — |
| 5 | 60 | O$_2$ | 0.121 | 23.6 | 0.04 | 96.2 | 98 |
| 6 | 120 | O$_2$ | 0.342 | 23.8 | — | 93.2 | — |
| O$_2$ overpressure 280 |
| 1 | 0 | N$_2$ | 4.38 | 12.5 | — | — | — |
| 2 | 5 | O$_2$ | 0.339 | 19.0 | 0.15 | 92.3 | 92.5 |
| 3 | 15 | O$_2$ | 0.143 | 19.4 | — | 96.7 | — |
| 4 | 30 | O$_2$ | 0.124 | 20.0 | — | 97.2 | — |
| 5 | 60 | O$_2$ | 0.125 | 21.2 | 0.06 | 97.1 | 97.0 |
| 6 | 120 | O$_2$ | 0.134 | 23.0 | — | 97.0 | — |

The foregoing tests confirm effective iron removal from the solution together with in excess of 90% hexavalent selenium removal under the stated oxidizing conditions.

EXAMPLE 6

This example indicates the effect of oxygen overpressure to provide oxidizing conditions for indicated retention periods subsequent to heating in a nitrogen atmosphere. A sulfate solution containing 67.3 g/l of Cu$^{2+}$, 7.19 g/l Fe$_T$, 5.8 g/l Fe$^{2+}$, 4.15 g/l H$_2$SO$_4$ and 2.0 mg/l Se$^{6+}$ was heated under a nitrogen atmosphere to 205° C. with agitation in a titanium autoclave. Results of tests conducted at different oxygen overpressures are shown in Table 6 below.

EXAMPLE 7

This example shows conversion of selenium at various low temperatures and removal of tetravalent selenium by cementation with copper. 1.5 liter feed solutions containing about 50 g/l Cu, 5 g/l Fe$_T$, 10 g/l Zn, 10 g/l H$_2$SO$_4$ and 2.5 mg/l Se$^{6+}$ as Na$_2$SeO$_4$ were heated under a nitrogen atmosphere to the designated temperatures and maintained under the nitrogen atmosphere for 5 hours, excepting one test maintained at 205°

C. for 15 minutes, the charges then cooled and 2 g/l Cu powder added with agitation at 82° C. for 1 hour under the nitrogen atmosphere at about ambient pressure.

TABLE 7

| Temp. (°C.) | Time (hrs.) | | Filtrate Assays | | | | | | Conversion $Se^{6+} \rightarrow Se^{4+}$ (%) | Se Removal (%) |
|---|---|---|---|---|---|---|---|---|---|---|
| | | | (g/l) | | | | (mg/l) | | | |
| | | | Cu | $H_2SO_4$ | $Fe_T$ | $Fe^{2+}$ | $Se_T$ | $Se^{4+}$ | | |
| | Head | | 52.0 | 10.0 | 5.19 | 4.62 | 2.5 | 0.03 | | |
| 138 | 5 | 5 hrs. under $N_2$ | 53.0 | 10.0 | 5.19 | 4.52 | 2.6 | 0.43 | ~16 | 0 |
| 82 | 1 | 1 hr. with 2 g/l Cu° | 53.4 | 8.82 | 5.41 | 5.06 | 2.1 | 0.006 | | ~16 |
| | Head | | 52.0 | 10.0 | 5.19 | 4.62 | 2.5 | 0.03 | | |
| 160 | 5 | 5 hrs. under $N_2$ | 52.5 | 10.7 | 4.75 | 4.18 | 1.4 | 1.0 | ~84 | ~44 |
| 82 | 1 | 1 hr. with 2 g/l Cu° | 53.8 | 7.43 | 5.46 | 5.18 | 0.24 | 0.02 | ~90 | ~90 |
| | Head | | 52.0 | 10.0 | 5.19 | 4.62 | 2.5 | 0.03 | | |
| 182 | 5 | 5 hrs. under $N_2$ | 52.2 | 10.7 | 5.02 | 4.54 | 1.55 | 1.48 | ~97 | ~38 |
| 82 | 1 | 1 hr. with 2 g/l Cu° | 53.5 | 9.18 | 5.40 | 5.25 | 0.29 | 0.03 | ~90 | ~88 |
| | Head | 15 min under $N_2$ | 52.0 | 10.0 | 5.19 | 4.62 | 2.5 | 0.03 | | |
| 205 | 0.25 | 15 min under $N_2$ | 52.2 | 11.2 | 4.69 | 3.95 | 0.2 | 0.17 | ~99 | 92 |
| 82 | 1.0 | 1 hr with 2 g/l Cu° | 53.5 | 8.59 | 5.52 | 5.20 | <0.1 | 0.02 | >96 | >96 |

Optimum selenium conversion was achieved at 205° C. within 15 minutes retention time with excellent selenium removal in 1 hour at a low temperature of 82° C. by copper cementation.

It will be understood of course that modifications can be made in the embodiment of the invention illustrated and described herein without departing from the scope and purview of the invention as defined by the appended claims.

What we claim as new and desire to secure by Letters Patent of the United States is:

1. A process for the removal of hexavalent selenium and iron from a copper sulfate solution containing up to 25 g/l sulfuric acid comprising the steps of (a) heating the solution to a temperature in the range of 182° C. to 220° C. under an oxygen-free atmosphere in the presence of at least 3 g/l bivalent iron and maintaining the solution at said temperature for a time in the range of 2 minutes to 10 hours sufficient to substantially convert hexavalent selenium to tetravalent selenium, and (b) treating the solution from step (a) by pressure oxidizing the bivalent iron with oxygen to trivalent iron while hydrolyzing the trivalent iron formed at a temperature in the range of about 180° to 210° C. to precipitate the iron out of solution as ferric oxide and co-precipitate the converted selenium in tetravalent form out of solution with the ferric oxide to obtain a final solution containing less than 0.5 g/l iron and less than 0.04 mg/l selenium.

2. A process as claimed in claim 1, heating and maintaining the solution under an oxygen-free atmosphere by expulsion of oxygen or air by injection of steam or nitrogen.

3. A process as claimed in claim 1, oxidizing and hydrolyzing the bivalent iron to ferric oxide under an oxygen pressure of about 140 to 450 kPa.

4. A process as claimed in claim 1, wherein the temperature of step a is in the range of 190° C. to 220° C.

* * * * *